United States Patent
Fox et al.

(10) Patent No.: US 9,039,289 B2
(45) Date of Patent: May 26, 2015

(54) SEGMENTED BEARING RETAINER

(71) Applicant: The Timken Company, North Canton, OH (US)

(72) Inventors: Gerald P. Fox, Massillon, OH (US); Christopher S. Marks, Massillon, OH (US); Brian Werner, Carrollton, OH (US); Thomas J. Rybkoski, Canton, OH (US); Hans Landin, Massillon, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 14/384,707

(22) PCT Filed: Mar. 5, 2013

(86) PCT No.: PCT/US2013/029100
§ 371 (c)(1),
(2) Date: Sep. 12, 2014

(87) PCT Pub. No.: WO2013/180774
PCT Pub. Date: Dec. 5, 2013

(65) Prior Publication Data
US 2015/0063738 A1 Mar. 5, 2015

Related U.S. Application Data

(60) Provisional application No. 61/654,159, filed on Jun. 1, 2012.

(51) Int. Cl.
*F16C 33/54* (2006.01)
*F16C 33/50* (2006.01)
(Continued)

(52) U.S. Cl.
CPC ............... *F16C 33/508* (2013.01); *F16C 43/04* (2013.01); *F16C 43/065* (2013.01)

(58) Field of Classification Search
CPC ..................................................... F16C 33/548
See application file for complete search history.

(56) References Cited

U.S. PATENT DOCUMENTS 847,261 A 3/1907 Rennerfelt
930,599 A 8/1909 Hess
(Continued)

FOREIGN PATENT DOCUMENTS

DE 8621532 12/1987
DE 4027109 3/1992
(Continued)

OTHER PUBLICATIONS

International Search Report for PCT application PCT/US2013/029100 dated Jul. 10, 2013, 3 pages.
(Continued)

Primary Examiner — Thomas R. Hannon
(74) Attorney, Agent, or Firm — Michael Best & Friedrich LLP

(57) ABSTRACT

A bearing cage assembly (100) comprises a plurality of discrete bridge elements (206) disposed between adjacent rolling elements (112) and coupled between first and second axially spaced cage support wire rings (102, 104) which are appropriately tensioned. Spacers (110) are disposed between adjacent bridge elements and engage the bridge elements in a piloted engagement. The bridge elements maintain a separation between rolling elements, retain the rolling elements within the bearing assembly, and function as a lubrication reservoir for grease lubricated bearings. Profiled surfaces on the bridge elements position the bearing cage assembly on at least one axial end of the rolling elements.

23 Claims, 6 Drawing Sheets

(51) Int. Cl.
*F16C 43/04* (2006.01)
*F16C 43/06* (2006.01)

(56) References Cited

U.S. PATENT DOCUMENTS

| | | | |
|---|---|---|---|
| 1,996,841 A | 4/1935 | Stevens | |
| 3,284,146 A | 11/1966 | Ripple | |
| 3,582,164 A | 6/1971 | Hess et al. | |
| 5,388,918 A | 2/1995 | Williams | |
| 5,469,620 A | 11/1995 | Zinken | |
| 5,660,485 A | 8/1997 | Podhajecki et al. | |
| 5,897,215 A | 4/1999 | Mirring | |
| 6,068,408 A | 5/2000 | Mutoh et al. | |
| 6,287,012 B2 | 9/2001 | Matsuoka | |
| 6,461,049 B2 | 10/2002 | Straub et al. | |
| 6,471,408 B1 | 10/2002 | Ikeda et al. | |
| 6,619,845 B2 | 9/2003 | Murata | |
| 6,779,923 B2 | 8/2004 | Murata | |
| 7,073,948 B2 | 7/2006 | Neder et al. | |
| 7,507,028 B2 | 3/2009 | Markle | |
| 7,571,706 B2 | 8/2009 | Ichikawa et al. | |
| 7,753,593 B2 | 7/2010 | Tsujimoto | |
| 7,771,122 B2 | 8/2010 | Nagai | |
| 8,057,105 B2 | 11/2011 | Earthrowl et al. | |
| 8,167,501 B2 | 5/2012 | Perkinson et al. | |
| 8,282,286 B2 | 10/2012 | Kanai | |
| 8,308,372 B2 | 11/2012 | Omoto | |
| 2009/0046974 A1 | 2/2009 | Omoto et al. | |
| 2009/0324410 A1 | 12/2009 | Omoto et al. | |
| 2010/0129022 A1 | 5/2010 | Beyfuss et al. | |
| 2010/0166355 A1 | 7/2010 | Schlegel et al. | |
| 2010/0329599 A1 | 12/2010 | Beyfuss et al. | |
| 2011/0255817 A1 | 10/2011 | Beyfuss et al. | |
| 2012/0014633 A1 | 1/2012 | Beyfuss et al. | |
| 2012/0163748 A1 | 6/2012 | Henneberger et al. | |
| 2012/0167391 A1 | 7/2012 | Werner | |
| 2012/0195541 A1 | 8/2012 | Friedrich et al. | |
| 2012/0207422 A1 | 8/2012 | Fukami et al. | |
| 2012/0263408 A1 | 10/2012 | Yamada et al. | |
| 2013/0294718 A1 | 11/2013 | Fox et al. | |

FOREIGN PATENT DOCUMENTS

| | | |
|---|---|---|
| DE | 102009006858 | 8/2010 |
| EP | 193058 | 9/1986 |
| FR | 362512 | 6/1906 |
| JP | 9242759 | 9/1997 |
| WO | 2008040290 | 4/2008 |
| WO | 2009006875 | 1/2009 |
| WO | 2011031931 A1 | 3/2011 |
| WO | 2011080961 | 7/2011 |
| WO | 2012076594 | 6/2012 |
| WO | 2012092107 A2 | 7/2012 |

OTHER PUBLICATIONS

International Written Opinion for PCT application PCT/US2013/029100 dated Jul. 10, 2013, 6 pages.

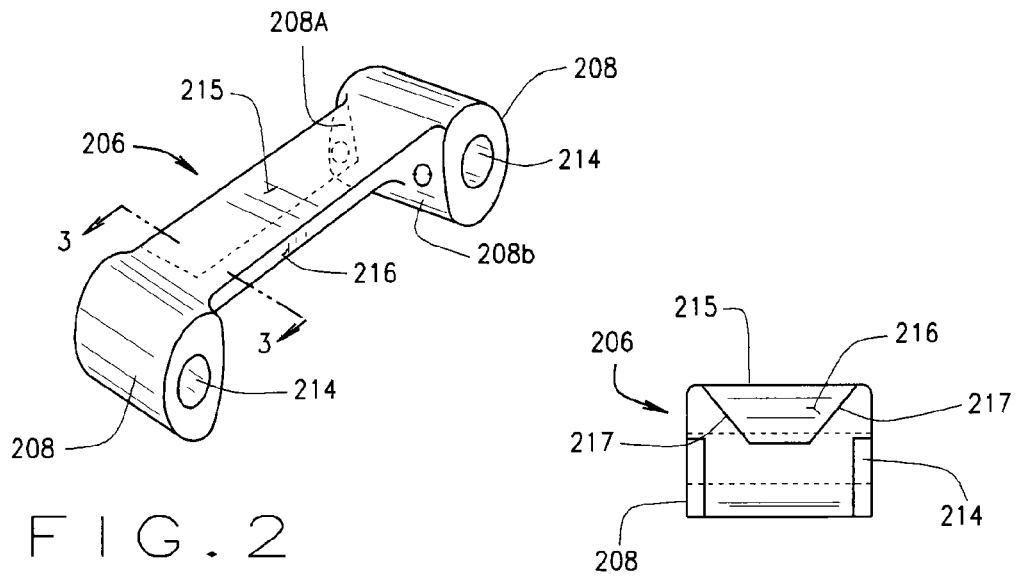
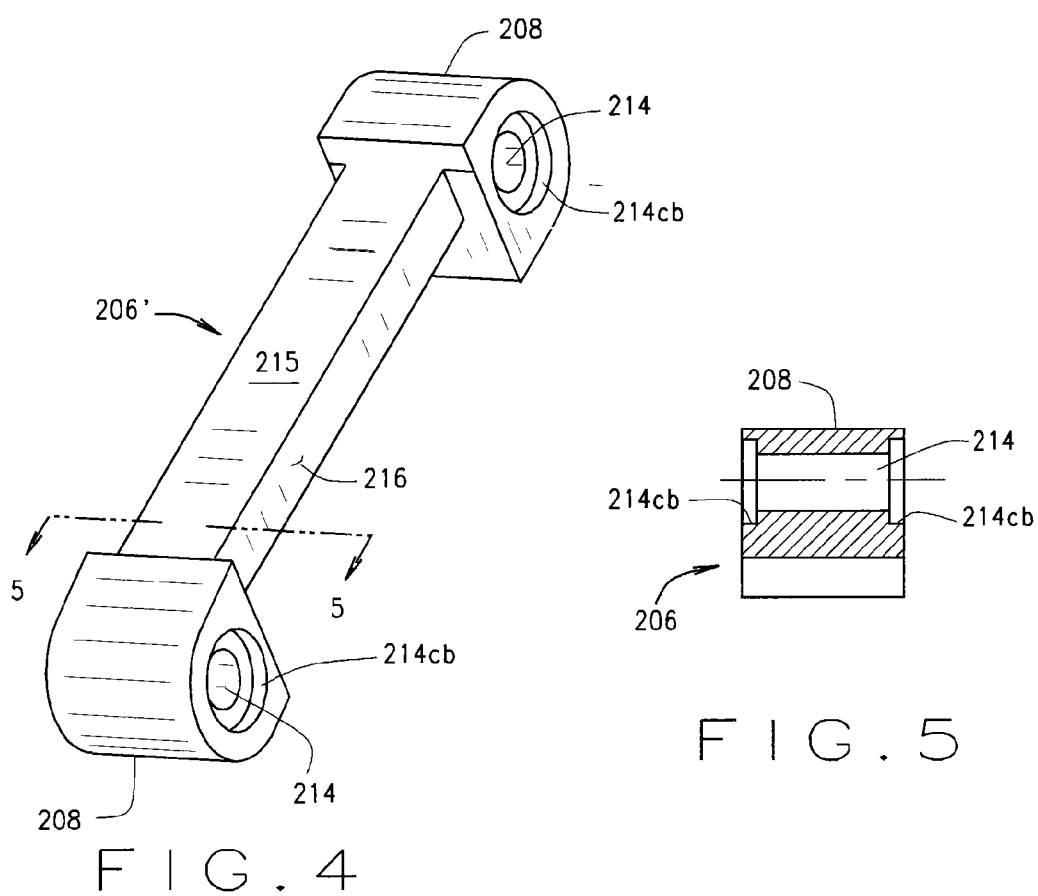

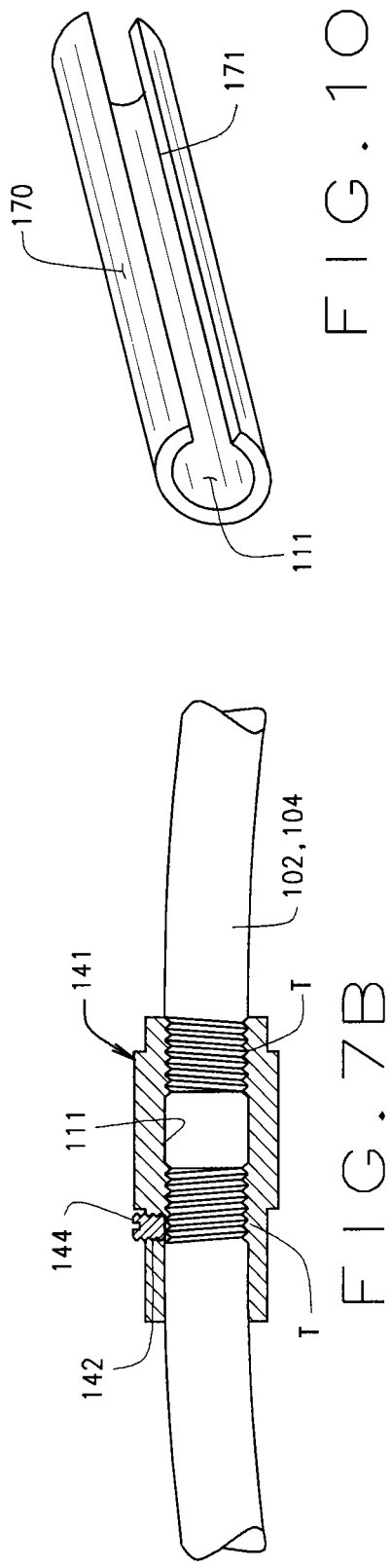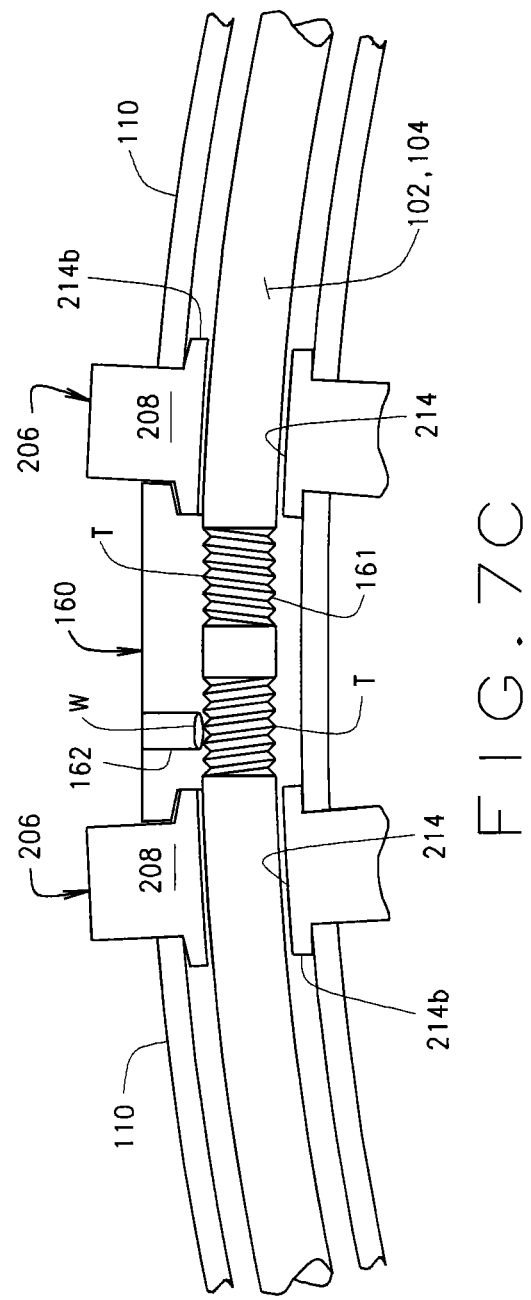

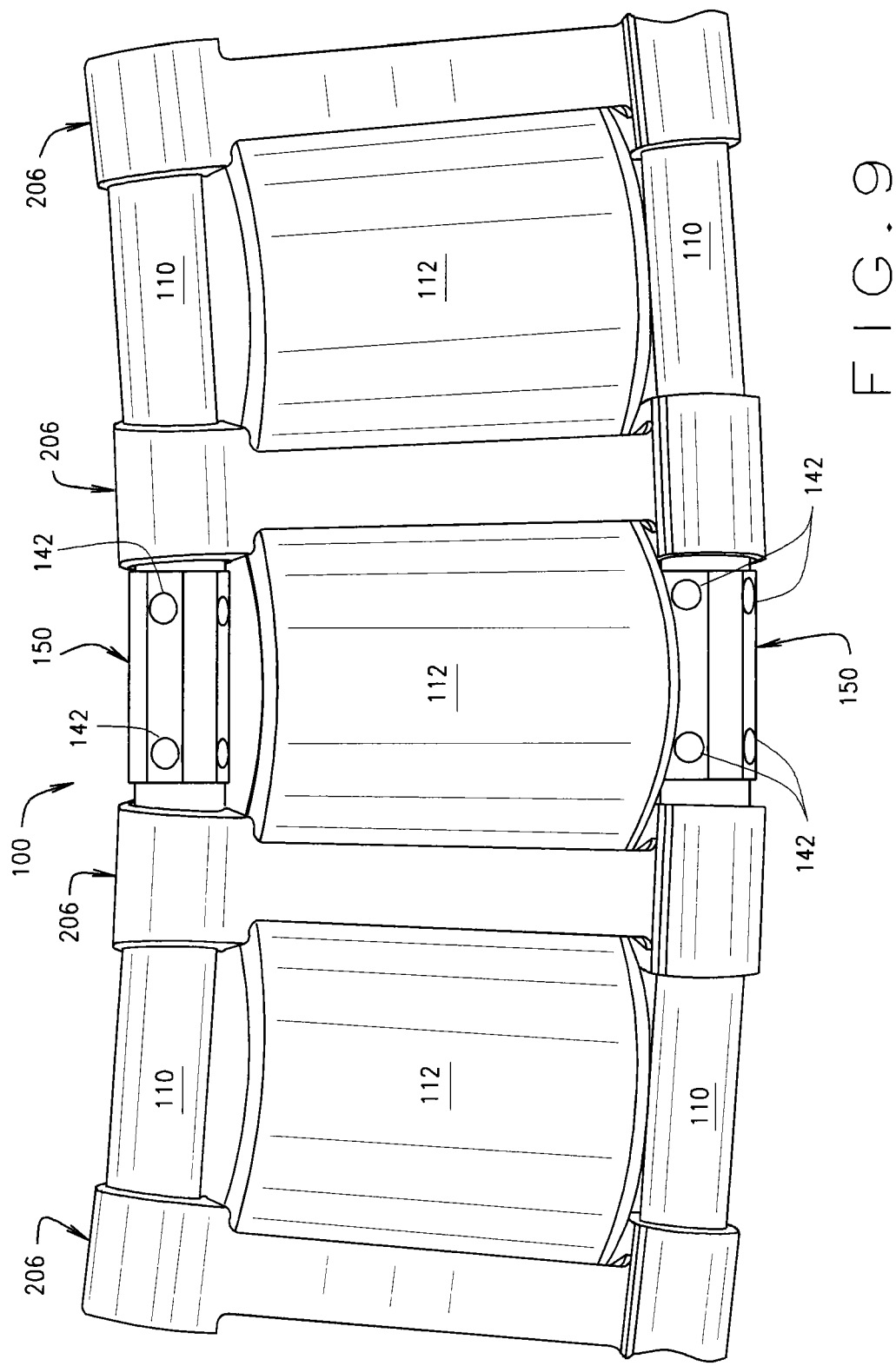

SEGMENTED BEARING RETAINER

CROSS-REFERENCE TO RELATED APPLICATIONS

The present application is related to and claims priority from U.S. provisional patent application Ser. No. 61/654,159 filed Jun. 1, 2012, which is herein incorporated by reference.

STATEMENT REGARDING FEDERALLY SPONSORED RESEARCH

Not Applicable.

BACKGROUND OF THE INVENTION

The present application is generally related to large bearing cage configurations, and in particular, but not exclusively, to a cage assembly for a large diameter bearing containing multiple heavy rolling elements and including discrete bridge elements coupled between axially-spaced cage wire rings located adjacent opposite axial ends of the rolling elements.

The usual approach to designing large-bearing cages (typically 1-4 meters in diameter) has been to extend the design styles for smaller, conventional bearings to the larger bearing sizes. The first and most common attempt at meeting the needs of larger bearings uses pin style cages to facilitate placement and retention of the rolling elements. While pin style cages provide excellent retention, they are heavy, complex, and costly to assemble. Furthermore, some pin style cage designs can partially block flow of lubricants (especially grease) to critical wear surfaces. They also cannot be disassembled without damaging either the cage rings or the cage pins.

Another cage design often considered is an "L" type design produced using various combinations of forging, forming, machining and precision cutting. The resulting cost of bearing cages produced using combinations of these various processes are unacceptably high, especially for the larger bearing sizes.

Yet another cage design is a polymer segmented style cage. While these cages have a demonstrated ability to perform satisfactorily, there are potential limitations in scaling up this design for larger bearings containing heavy rollers. Current polymer cages for very large bearings are made from polyether ether ketone (PEEK), an organic polymer thermoplastic which is relatively expensive. For extremely large bearings containing large rollers, the size and strength of the cage must be increased. The greater amount of PEEK required to make a sufficiently strong cage can therefore often be cost prohibitive. Accordingly, polymer segmented cages appear to be most suited for bearing cages with small to medium size rollers which only require small to medium size PEEK segments.

Based on the foregoing, it would be advantageous to provide a large bearing cage design having full functionality (roller retention, roller spacing, roller alignment, lubricant flow) for various sizes and types of bearings (e.g., tapered roller, cylindrical roller, spherical roller bearings, etc.) and which can be manufactured at a lower cost than is currently possible.

BRIEF SUMMARY OF THE INVENTION

Briefly stated, the present disclosure provides a bearing assembly having a plurality of rolling elements (rollers) disposed about the circumference of a race member and positioned in a spaced configuration by a segmented bearing retainer assembly. The segmented bearing retainer assembly comprises a plurality of discrete bridge elements coupled between first and second wire support rings located adjacent axially opposite ends of the bearing assembly.

Each discrete bridge element has a cross-sectional shape adapted to contact adjacent rolling elements on the rolling element's circumferential surface and radially displaced from the pitch diameter of the bearing. This maintains the spacing between adjacent rolling elements in the bearing assembly, and retains the rolling elements relative to the race member. A desired spacing arrangement about the circumference of the bearing assembly, between the wire support rings, is achieved using a plurality of spacers disposed on the rings. In a preferred embodiment the bridge elements and spacers have a piloted engagement. The rings extend through attachment eyelets formed in each end of each bridge element.

In one embodiment, the discrete bridge elements of the segmented bearing retainer assembly are disposed between adjacent rolling elements in the bearing assembly. Each bridge element includes an axially aligned bridge segment traversing between adjacent rolling elements. An end block at each axial end of the bridge element includes the attachment eyelet through which a wire support ring passes.

Each discrete bridge element further has a cross-sectional profile designed to distribute a contact load between a rolling element and an adjacent bridge element above (radially outward from) a pitch diameter of the bearing assembly. At least one surface on the end block is profiled to position the cage assembly against an end surface of the rolling elements.

In another disclosed embodiment, each discrete bridge element has a cross-sectional shape adapted to contact adjacent rolling elements on the rolling body's circumferential surface at a position which is radially inward from the pitch diameter of the bearing.

Additional surface profiling on a bridge element's end faces may be optimized to position the segmented bearing retainer assembly on the large end of the rolling elements so to establish and maintain a beneficial lubricant film between them.

In a preferred embodiment, the discrete bridge elements are of a powdered metal or sintered steel. The discrete bridge elements may be impregnated with a lubricant, or dipped in a lubricant for a period of time for the lubricant to be absorbed into the bridge element, or the bridge element may be vacuum impregnated with a lubricant. Optionally, the bridge elements may have surface features or finishes configured to, over time, trap and release lubricants.

The rings are initially open ended to allow for assembly of the bridge segments and spacers onto the rings. The free ends of the rings have a feature which facilitates subsequently joining the ends together as part of the final assembly. In one embodiment the rings have a groove near each end which allows the rings to be connected by a joining spacer, using a crimp joint. In another embodiment the free ends of the rings are threaded with opposite handed threads and a joining spacer in the form of a turnbuckle is used to join the ends of the rings together. This embodiment allows the spacers and bridge segments to be drawn together to a desired degree of force. By drawing the spacers and bridge elements tightly together a more rigid cage structure is obtained. In another embodiment one end of the ring has a groove formed in it to receive a crimp connection and the other end of the ring is threaded. In this embodiment, the common right handed threads only may be used and the need to use the less common left handed threads is eliminated. The joining spacer in this case has threads on only one side and is crimped on the other end.

For the embodiments using a threaded joining spacer to connect the respective ends of each ring together, a means to prevent the threaded engagement from backing off is desired. This may be accomplished by a thread adhesive, by a set screw engaging the spacer and ring or by welding the adjusting spacer to the ring.

The joining spacer may have features to make rotation easier when drawing the cage together. Common features employed are one or more flats, or octagonal or hexagon external geometries that will accept an open end wrench, or radial holes for rotation by a simple pin or by a spanner wrench.

A method of the present disclosure for assembling a segmented bearing retainer assembly about an inner race of a tapered bearing is accomplished by initially threading a plurality of discrete bridge elements and spacers onto ends of the first and second wire support rings. Each wire ring is then formed into an open loop and the ends of the rings are threaded with opposite handed threads. Discrete bridge elements and the spacers between them are first inserted onto the wire support rings. Individual rollers (rolling elements) are then inserted into the assembly by moving the bridge elements and spacers circumferentially around the wire support rings so to provide sufficient space for insertion of the rollers. After the final roller is installed on the inner race, the rings are parted in opposite directions to open up a space for insertion of a turnbuckle. The turnbuckle is then used to draw all of the bridge elements and spacers tightly together.

The foregoing features and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2 is a perspective view of a discrete bridge element of the segmented bearing retainer assembly of FIG. 1;

FIG. 3 is a sectional view of the discrete bridge element taken along line 3-3 in FIG. 2;

FIG. 4 is a perspective view of an alternate embodiment of a discrete bridge element in which each eyelet has a counter-bore formed at each of its ends;

FIG. 5 is a sectional view, taken along line 5-5 in FIG. 4, of an end block and illustrating the counter-bores formed at the ends of an eyelet;

FIGS. 7A-7C illustrate different assembly methods by which a piloted spacer is secured to a wire support ring;

FIGS. 8 and 9 represent portions of the segmented bearing retainer assembly using differently shaped turnbuckles; and.

FIG. 10 is a perspective view of a slotted or open sided spacer used in the assembly.

Corresponding reference numerals indicate corresponding parts throughout the several figures of the drawings. It is to be understood that the drawings are for illustrating the concepts set forth in the present disclosure and are not to scale.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
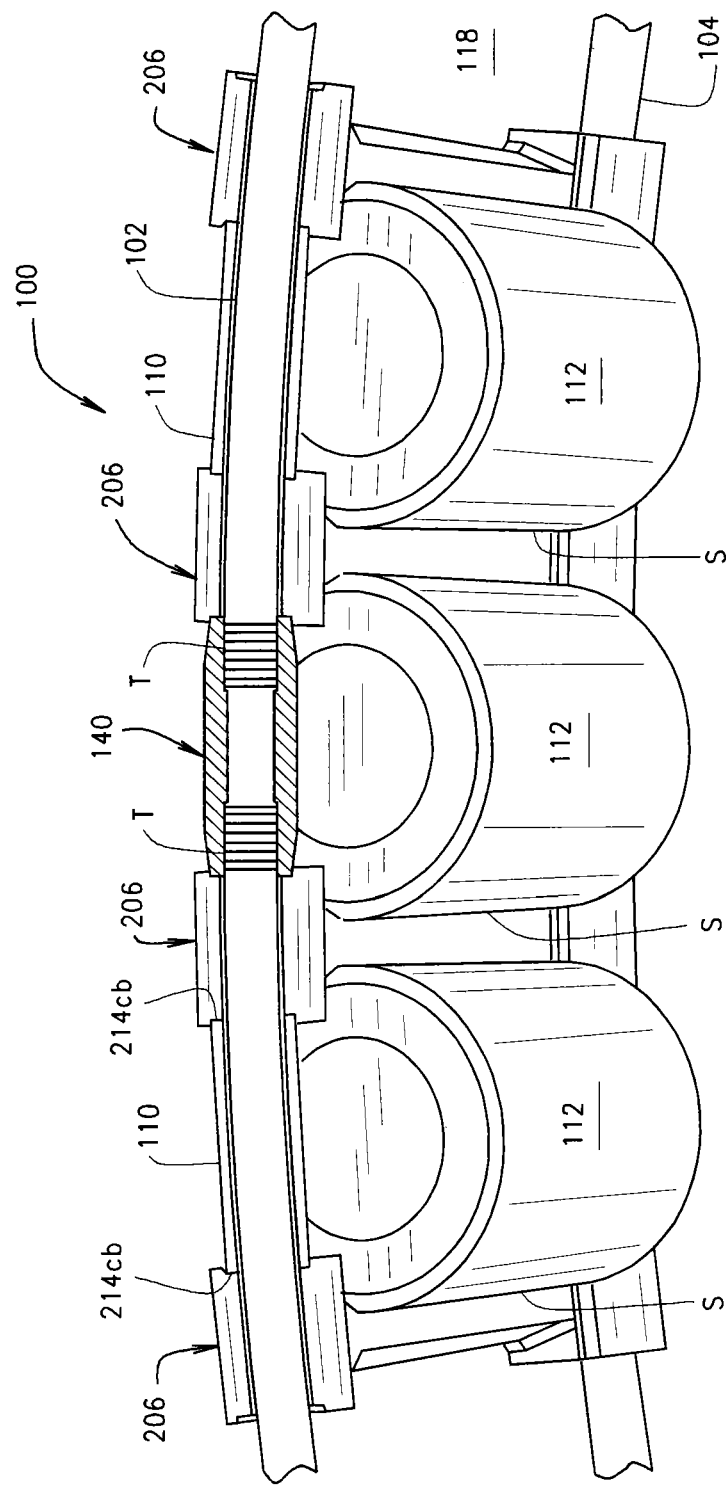
FIG. 1 is a view, partly in section, of a portion of a segmented bearing retainer assembly of the present disclosure.
Figure 7A:
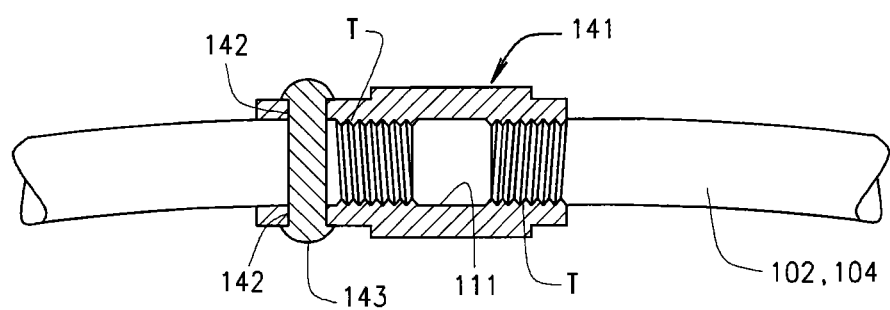
Figure 8:
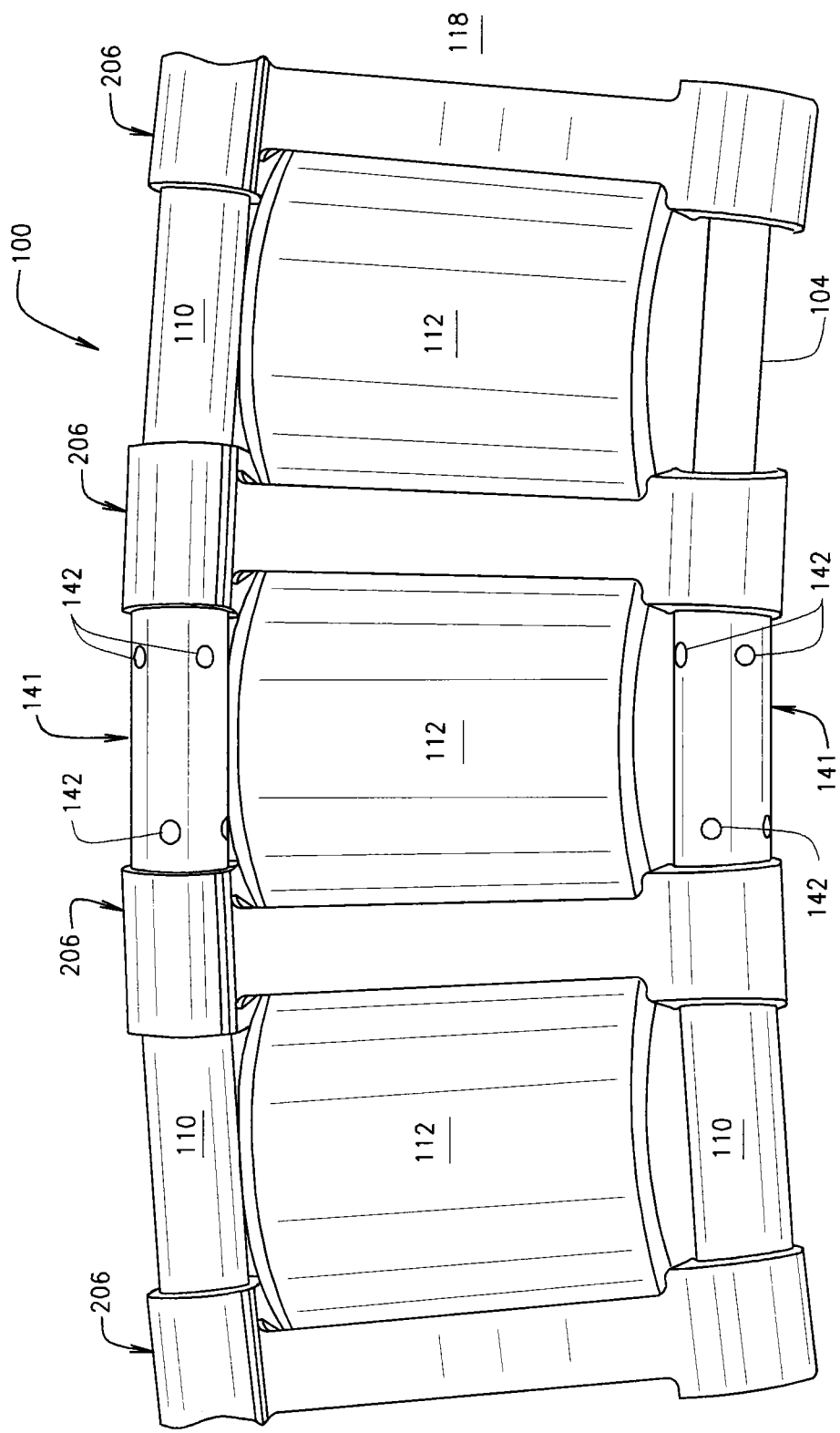

Referring to FIGS. 1, 8, and 9, a preassembled segmented bearing retainer or cage 100 comprises first circular hoop or ring 102 and a second and correspondingly sized and shaped circular hoop or ring 104. As particularly shown in FIG. 1, ring 104 is axially displaced from ring 102. Cage 100 also includes multiple discrete bridge elements 206 each of which spans the axial distance between rings 102, 104. The bridge elements are preferably made of a powdered metal material including sintered steel. Cage 100 further includes tubular spacers 110 each of which has a longitudinal bore 111 (see FIGS. 7A-7C) by which the spacers are inserted onto one of the rings 102, 104 and positioned between adjacent bridge elements 206 as shown in FIGS. 1, 8, and 9. As shown in FIGS. 1, 7A, and 7B, the spacers (which may comprise a turnbuckle 140) have a reduced diameter section at each of their ends. Also, while the outer surface of the spacers is generally round, as shown in FIG. 9, a spacer (turnbuckle) 150 has a polygonal shaped outer contour; for example, it may have a hexagonal or octagonal outer contour. Such a construction results in at least one flat surface on the outer contour of the spacer.

Referring to FIG. 7C, a spacer (turnbuckle) 160 has a threaded longitudinal bore 161 in which threaded ends of rings 102, 104 are received. In this embodiment, the spacer has a uniform outer diameter throughout its length.

As designed and constructed, each roller 112 moves freely within its respective pocket in bearing retainer 100 such that the load on any bridge element 206 is only a function of the mass of the roller 112 either ahead of or behind it, or a combination of the masses of both rollers, depending on the dynamic conditions.

Different embodiments of bridge element 206 are shown in FIGS. 2-6. Regardless of the particular bridge element design, at each end of the bridge element an end block 208 is formed. The end blocks are axially spaced from each other and an eyelet 214 is formed in each end block. Each eyelet comprises a bore extending longitudinally through the end block, and the eyelets are sized to allow one of the rings 102, 104 to be inserted through a respective one of the end blocks as shown in FIGS. 1, 8, and 9.

Figure 6:
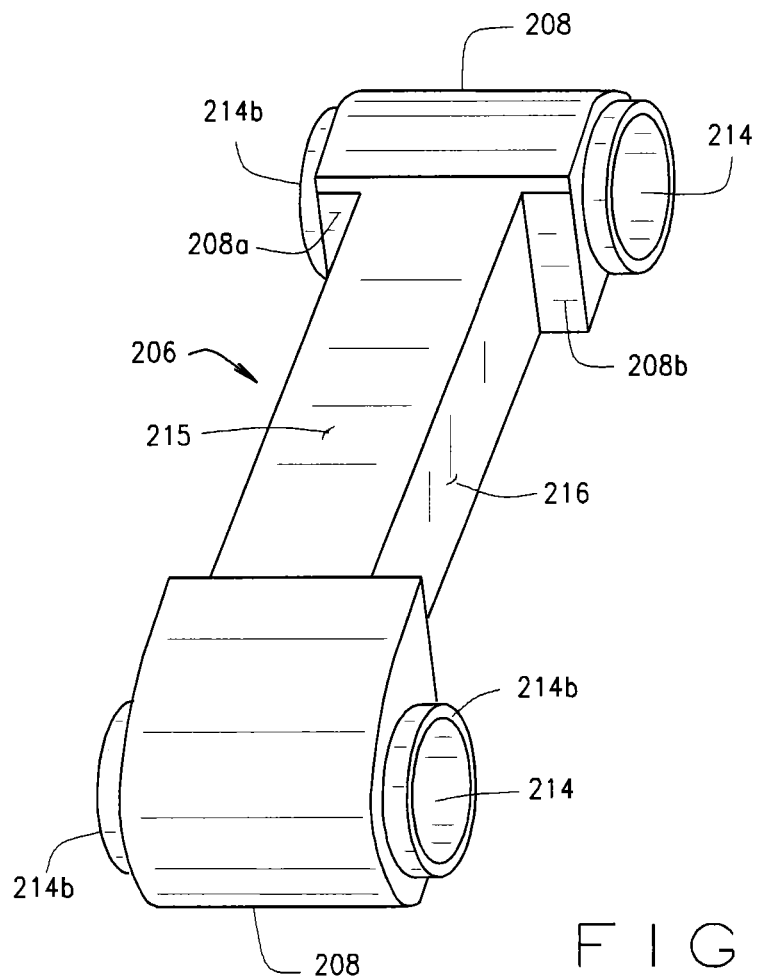
FIG. 6 is a perspective view of another alternate embodiment of a discrete bridge element in which bosses are formed at the ends of the eyelets.

Referring to FIGS. 2, 4, and 6, the end blocks 208 of each bridge element 206 are separated by a retention web 216 which is attached to the inner surface of a bridge 215 that extends between the end blocks. Retention web 216 helps keep bridge element 206 in alignment with the external curvature of the rollers 112. This, in turn, helps restrict radial deflection of cage 100 during operation, as well as maintain adequate lubrication. As shown in FIG. 1, for example, as a roller 112 travels through a load zone of the bearing, it moves through a pocket space S formed between adjacent bridge elements 206 until the roller contacts the bridge element rotationally ahead of it.

In a preferred embodiment, retention web 216 of a bridge element 206 has straight and flat surfaces 217 (see FIG. 3) which distribute the contact load between a roller 112 and the bridge element. A contact region is disposed radially outward from the pitch diameter of the bearing in substantially the same location as the contact region provided by a conventional above centerline "L" type bearing cage. If retention web 216 does not extend radially inwardly past the bearing pitch diameter, additional space is provided between adjacent rollers 112 as to permit the storage and resupply of grease (or other lubricant) to the various contact regions located about the roller. Those of ordinary skill in the art will recognize that bridge element 206 may be configured with a retention web 216 and bridge 215 in a position which is radially inward from the pitch circle or diameter of the bearing. Thus, the contact load between a roller 112 and a bridge element 206 is within a contact region which is correspondingly disposed radially inward from the pitch diameter of the bearing. Those of ordinary skill in the art will further understand that the particular construction of a bridge 215 and retention web 216 depends upon the particular usage of the segmented bearing retainer 100.

Construction of the bearing retainer or cage 100, as shown in FIG. 1, is for use with a tapered bearing. Based on the size of an inner race 118 (see FIGS. 1 and 8), the required diameters of rings 102, 104 are determined.

During assembly, each ring 102, 104 is initially open, thus allowing all of the bridge elements 206, spacers 110, and a turnbuckle 140 (see FIG. 1) if one is used, to be slipped onto and positioned around the respective rings. In a preferred embodiment, the number of spacers 110 is one less (N–1) than the number N of rollers 112 employed in the bearing. In alternate embodiments, the number of bridge elements 206 equals the number N of rollers 112. After all the bridge elements and spacers are installed on the rings, the ends of the rings are brought together and joined together. For example, as shown in FIG. 1, the opposite ends of rings 102, 104 are threaded, as indicated at T, and the respective ends of each ring are threaded into a turnbuckle 140 to form a continuous ring.

Alternate ways of closing rings 102, 104 are shown in FIGS. 7A-7C. In FIG. 7A, a turnbuckle/spacer 141 has a radial bore 142 extending both through it and the ring 102, 104 whose ends are captured in the turnbuckle/spacer. An anti-rotation pin 143 is inserted through this bore. In FIG. 7B, bore 142 extends only through one side of the turnbuckle/spacer and a set screw 144 is used to secure the turnbuckle/spacer to the ring. In FIG. 7C, a weld W is formed at the inner end of a radial bore 162 in spacer 160 to attach the turnbuckle/spacer and the ring together.

Also, although not shown in the drawings, the ends of the spacer 141 can be crimped about the ends of the support ring inserted in the spacer. It will be appreciated that the ends of the ring can be secured to a turnbuckle/spacer using a combination of the above techniques. For example, one end of the ring may be threadably received in a turnbuckle with the other end of the ring crimped in place in the other end of it. Attachment of the ends of ring 102, 104 to the spacer can further be done using an adhesive material. Regardless of the method (or methods) of attachment used, in addition to securely attaching the ends of ring 102, 104 together to form a completed ring, the turnbuckle/spacer to which the ring ends are secured is now prevented from rotational movement which could otherwise, over time, loosen the connection.

Those of ordinary skill in the art will recognize that the spacers 110 may float on the rings 102, 104 between the discrete bridge elements 206. Referring to FIGS. 2 and 3, the outer ends of the bores 214 formed in each end block 208 of a bridge element 206 are flush with the sides of the end block. Accordingly, spacers 110 installed between the adjacent bridge elements float between the bridge elements.

Referring to the bridge element 206 shown in FIGS. 4 and 5, spacers installed between adjacent bridge elements as shown in these figures may be in a piloted engagement with the discrete bridge elements so to maintain a desired relative positioning of the components. In this embodiment of bridge element 206, each end block 208 includes a counter-bore 214cb formed at the outer end of each bore (eyelet) 214 that extends through the respective end block. As shown in FIG. 1, the counter-bores are sized to receive the spacers 110.

Alternatively, as shown in FIG. 6, each end block 208 on a bridge segment 206 is formed to have a raised boss 214b surrounding the outer ends of each bore 214. The bosses 214b are sized to seat inside the inner end of an adjacent spacer 160 as shown in FIG. 7C.

In one method of assembly, bearing retainer 100 is formed by supporting inner race 118 on a work table (or other surface) with its back face or large end facing downward. The assembled cage is then brought into position over and around the inner race. One by one, each roller 112 is inserted onto the assembly by moving the bridge elements 206 and spacers 110 (if required) circumferentially around the rings 102, 104 so to make space available for insertion of the next roller. For installation of the final roller into its space on inner race 118, the already assembled rollers 112, bridge segments 206, and spacers 110 are moved in opposite directions about the circumference of the rings thereby to create sufficient space into which to fit this roller. If required, after the last roller is inserted into place, a final bridge element 206 is installed to fill any remaining gap between the rollers 112.

In an alternate method of assembly, the ends of rings 102, 104 remain separated during the assembly process. The rings are brought into position over and around inner race 118 and are moved apart to create a circumferential gap of sufficient width to allow bridge elements 206 and spacers 110 (if the design so requires them) to be slipped onto the rings. The bridge elements and spacers are spread equally around inner race 118 with rollers 112 positioned between them. When all of the rollers, bridge elements and spacers are installed, the ends of each ring are drawn together until a proper tension is created and an appropriate clearance is established between the rollers and the cage assembly. This clearance is referred to as "cage shake". Once the requisite cage shake is established through proper tensioning of the rings, the ends of the rings are joined together as previously described.

The method used for joining the separated ends of rings 102, 104 must close the gap between the installed components so a correct amount of circumferential clearance exists in the "stack up" of spacers 110 and bridge elements 206. This is conveniently accomplished by modifying the width(s) of one or more spacers, if necessary.

The assembly methods described with respect to FIGS. 7A-7C limit circumferential movement of the spacers and bridge segments 206 on the ring should tension on the ring be lost over time due, for example, to creep or wear. By limiting the stack of potential gaps between the spacers and bridge elements, the ability of cage 100 to retain rollers 112 will be preserved for longer periods should the cage begin to lose tension.

To further limit the stack up of potential gaps, one or more spacers 110 are fixed to a ring 102, 104 by welding. This will limit the stack up of accumulated gap between each of the fixed spacers, including the turnbuckle spacer. To facilitate spacing, the spacers 141, 150, and 160 have a radial bore 142, 162 respectively, in which a welding material is deposited. Or, as shown in FIG. 10, a spacer 170 is a split spacer having a longitudinal slot 171 extending the length of the spacer as shown in FIG. 10. When spacer 170 is used, the welding material is deposited in slot 171 to attach the spacer to a ring 102, 104.

Compared with some previous segmented bearing cage designs, bearing retainer 100 of the present disclosure is configured to provide an improved flow of lubricant to critical wear surfaces within the bearing assembly; for example, between bridge elements 206 and rollers 112. Use of circular cross-section rings 102, 104 and eyelet couplings 214 for the bridge elements provides openings for the axial movement of lubricant into the spaces between adjacent rollers. Again to further enhance lubrication, exposed surfaces of the bridge elements or segments may receive special finishes or textures to entrap and release lubricants in the contact regions between the bridge elements and rollers. These features can be applied to the appropriate surfaces as previously described. Those of ordinary skill in the art will recognize that the bridge elements 206 may have more complex geometries than those shown in the drawings without departing from the scope of the invention.

While, as previously noted, the bridge segments are preferably made of a powdered metal, they may also be formed from a variety of materials including polymers and metals. Examples of suitable constructions include a compacted and sintered powered metal or steel construction which produces very strong bridge elements suitable for use with very large and heavy bearing designs, and which can optionally be impregnated (for example, by vacuum impregnation) with lubricating materials so to provide improved resistance to wear at critical surfaces within the bearing assembly. These type bridge elements may also have surface features or finishes which promote the trapping and releasing of lubricants.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A bearing cage structure for use with a bearing assembly having a plurality of rolling elements disposed about a circumference of a race member comprising:
   a first wire support ring disposed adjacent an axially first end of the rolling elements and the bearing assembly, and a second wire support ring disposed adjacent an axially second end of the rolling elements and the bearing assembly;
   a plurality of discrete bridge elements coupled between the first and second wire support rings to maintain a spacing between adjacent rolling elements and to retain said rolling elements relative to said race member; and,
   a plurality of generally tubular spacers disposed on at least one of said first and second wire support rings annularly between adjacent bridge elements, said bridge elements and said spacers configured for piloted engagement of said bridge elements with said spacers to maintain a desired spacing between adjacent bridge elements.

2. The bearing cage structure of claim 1 in which the bridge elements are made of a powdered metal.

3. The bearing cage structure of claim 1 in which each bridge element is configured to maintain a spacing between adjacent rolling elements to retain said rolling elements relative to said race member and to contact said rolling elements in a contact region radially displaced from a pitch diameter of the bearing assembly.

4. The bearing cage structure of claim 1 wherein each bridge element has a bore extending through each end thereof with a counter-bore formed at each end of each bore, said counter-bores configured to engage the ends of adjacent spacers installed on said support rings.

5. The bearing cage structure of claim 1 wherein each bridge element has a bore extending through each end thereof with a boss formed about each end of each bore and configured to engage adjacent spacers on said support rings.

6. The bearing cage structure of claim 1 in which one spacer on each ring is used to connect the ends of a support ring together, and to do so such that the spacer is prevented from subsequently losing engagement with the ends of a ring by constraining rotational movement of the spacer.

7. The bearing structure of claim 6 in which said one spacer comprises a turnbuckle.

8. The bearing structure of claim 7 wherein the respective ends of each ring are threaded for threaded engagement of the ends of the ring with the turnbuckle to close the ring.

9. The bearing structure of claim 1 wherein at least one spacer is affixed to one of the rings.

10. The bearing structure of claim 9 in which said one spacer has a radial bore formed in it, said bore extending through an end of a ring inserted into said one spacer, and a pin inserted through said bore to connect the spacer and ring together.

11. The bearing structure of claim 9 in which said one spacer has a radial bore extending through one side of it for installation of a set screw or deposition of a welding material to capture one end of a support ring in the spacer.

12. The bearing structure of claim 9 in which the ends of a ring are crimped to respective ends of the spacer.

13. The bearing structure of claim 9 wherein a spacer has a longitudinal slot extending lengthwise of it.

14. The bearing cage structure of claim 1 in which the total number of spacers disposed on at least one of said support rings is equal to the number of rolling elements.

15. The bearing cage structure of claim 14 in which the number of bridge elements equals the number of rolling elements.

16. The bearing structure of claim 1 in which a spacer has at least one flat section on an external surface thereof.

17. The bearing structure of claim 16 in which said spacer has a hexagonal shaped outer contour.

18. The bearing structure of claim 16 in which said spacer has an octagonal shaped outer contour.

19. The bearing structure of claim 16 in which said spacer has at least one radial hole extending through it.

20. A method for assembling a bearing cage structure of a bearing assembly, comprising:
   selecting first and second wire support rings whose circumferential lengths are selected to accommodate dimensions of the bearing assembly;
   coupling said first and second rings together in an axially spaced arrangement by fitting a plurality of discrete bridge elements onto said rings, said bridge elements each being fitted onto said rings, when said rings are open, via eyelets at opposite axial ends of each bridge element so to couple the rings together by said plurality of bridge elements which are spaced substantially uniformly about a circumference of said rings;
   disposing generally tubular spacers on said first and second support rings between adjacent bridge elements using a piloted engagement which positions said spacers relative to said bridge elements;
   securing opposite ends of said first ring together to form a first closed wire support ring;
   securing opposite ends of said second ring together to form a second closed wire support ring; and fitting a plurality of rolling elements into said assembly, said spacing between adjacent rolling elements determined by the spacing between the adjacent bridge elements which couple the first and second wire support rings together.

21. The method of claim 20 further including configuring each of said bridge elements to maintain a spacing between adjacent rolling elements to retain said rolling elements relative to a race member and to contact said rolling elements in a contact region radially displaced from a pitch diameter of the bearing assembly.

22. The method of claim 21 further including forming each bridge element to have a bore extending through each end of the bridge element with a counter-bore formed at each end of each bore, said counter-bores configured to engage the ends of adjacent spacers installed on said support rings.

23. The method of claim 21 further including forming each said bridge element to have a bore extending through each end of the bridge element with a boss formed about each end of each bore and configured to engage adjacent spacers on said support rings.

\* \* \* \* \*